United States Patent
Nakamura

(10) Patent No.: US 11,038,882 B2
(45) Date of Patent: Jun. 15, 2021

(54) REMOTE CONTROL SYSTEM, SERVER DEVICE, TERMINAL DEVICE, ELECTRICAL APPARATUS REGISTRATION METHOD, AND PROGRAM

(71) Applicant: PANASONIC INTELLECTUAL PROPERTY MANAGEMENT CO., LTD., Osaka (JP)

(72) Inventor: Koji Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 16/466,989

(22) PCT Filed: Mar. 19, 2018

(86) PCT No.: PCT/JP2018/010680
§ 371 (c)(1),
(2) Date: Jun. 5, 2019

(87) PCT Pub. No.: WO2018/186157
PCT Pub. Date: Oct. 11, 2018

(65) Prior Publication Data
US 2019/0312867 A1 Oct. 10, 2019

(30) Foreign Application Priority Data
Apr. 3, 2017 (JP) .............................. JP2017-073482

(51) Int. Cl.
*H04L 29/06* (2006.01)
*H04L 9/32* (2006.01)
*H04Q 9/00* (2006.01)

(52) U.S. Cl.
CPC ............ *H04L 63/0876* (2013.01); *H04L 9/32* (2013.01); *H04L 63/0869* (2013.01); *H04L 63/0884* (2013.01); *H04Q 9/00* (2013.01)

(58) Field of Classification Search
CPC ... H04L 63/0876; H04L 9/32; H04L 63/0869; H04Q 9/00; G08C 17/00; G08C 2201/21
See application file for complete search history.

(56) References Cited

U.S. PATENT DOCUMENTS

| | | | |
|---|---|---|---|
| 10,382,203 B1* | 8/2019 | Loladia | H04L 9/14 |
| 2013/0014225 A1* | 1/2013 | Kageyama | H04L 67/16 |
| | | | 726/4 |
| 2017/0171198 A1 | 6/2017 | Yamada et al. | |

FOREIGN PATENT DOCUMENTS

| WO | 2015/033594 A1 | 3/2015 |
|---|---|---|
| WO | 2015/118934 A1 | 8/2015 |

OTHER PUBLICATIONS

The Extended European Search Report dated Apr. 14, 2020 for the related European Patent Application No. 18780982.7.
(Continued)

*Primary Examiner* — Huan V Doan
(74) *Attorney, Agent, or Firm* — McDermott Will and Emery LLP

(57) ABSTRACT

A remote control system includes an electrical apparatus, a terminal device, and a server device. The terminal device receives a first encrypted apparatus ID in which an apparatus ID is encrypted from the electrical apparatus. The terminal device transmits the first encrypted apparatus ID to the electrical apparatus. The electrical apparatus transmits the apparatus ID and the first encrypted apparatus ID to the server device. The terminal device transmits the first encrypted apparatus ID to the server device. The server device determines whether there is a match in the first encrypted apparatus ID received from the electrical appara-
(Continued)

tus or the terminal device. When there is a match, the server device registers the apparatus ID in a first security state.

17 Claims, 15 Drawing Sheets

(56)  References Cited

OTHER PUBLICATIONS

International Search Report and Written Opinion issued in International Patent Application No. PCT/JP2018/010680, dated Apr. 17, 2018; with partial English translation.

* cited by examiner

FIG. 7

| PRODUCT INFORMATION | FIRST ENCRYPTED APPARATUS ID |
|---|---|
| NA-1000A | abcdefghijklmn12345 |
| NA-2000A | abcdefghijklmn1234 |
| : | : |
| | |

FIG. 10

| APPARATUS ID | FIRST ENCRYPTED APPARATUS ID | SECOND ENCRYPTED APPARATUS ID |
|---|---|---|
| NA-1000A+00001 | abcdefghijklmn12345 | 12345abcdefghijklmn |
| NA-2000A+00001 | abcdefghijklmn1234 | 1234abcdefghijklmn |
| : | : | : |
| | | |

FIG. 11A

| APPARATUS ID | FIRST ENCRYPTED APPARATUS ID | SECOND ENCRYPTED APPARATUS ID | REGISTRATION STATE |
|---|---|---|---|
| NA-1000A+00001 | abcdefghijklmn12345 | 12345abcdefghijklmn | COMPLETED |
| NA-2000A+00001 | abcdefghijklmn1234 | 1234abcdefghijklmn | PROVISIONAL |
| : | : | : | : |
|  |  |  |  |

FIG. 11B

| APPARATUS ID | FIRST ENCRYPTED APPARATUS ID | SECOND ENCRYPTED APPARATUS ID | REGISTRATION STATE |
|---|---|---|---|
| NA-1000A+00001 | abcdefghijklmn12345 | 12345abcdefghijklmn | COMPLETED |
| NA-2000A+00001 | abcdefghijklmn1234 | 1234abcdefghijklmn | COMPLETED |
| : | : | : | : |
|  |  |  |  |

FIG. 13

| APPARATUS ID | PRODUCT INFORMATION | FIRST ENCRYPTED APPARATUS ID |
|---|---|---|
| NA-1000A+00001 | NA-1000A | abcdefghijklmn12345 |
| NA-2000A+00001 | NA-2000A | abcdefghijklmn1234 |
| ⋮ | ⋮ | ⋮ |
|  |  |  |

REMOTE CONTROL SYSTEM, SERVER DEVICE, TERMINAL DEVICE, ELECTRICAL APPARATUS REGISTRATION METHOD, AND PROGRAM

CROSS-REFERENCE OF RELATED APPLICATIONS

This application is the U.S. National Phase under 35 U.S.C. § 371 of International Patent Application No. PCT/JP2018/010680, filed on Mar. 19, 2018, which in turn claims the benefit of Japanese Application No. 2017-073482, filed on Apr. 3, 2017, the entire disclosures of which Applications are incorporated by reference herein.

TECHNICAL FIELD

The present disclosure relates to an apparatus registration method used in an electrical apparatus network system that is built by connecting electrical apparatuses installed in a house or apartment room to a network.

BACKGROUND ART

In recent years, there have been provided services for remotely controlling electrical apparatuses such as an air-conditioner, a microwave oven, and a refrigerator connected to a network by a mobile terminal.

In such a communication system that controls electrical apparatuses, it is possible to remotely perform power control and operation control of personal computers or home electrical apparatuses installed in a house or apartment room from a mobile terminal. In addition, the user accumulates and saves the records of control of the electrical apparatuses as an operation history in a server so that the operation history can be analyzed later. Accordingly, it is expected to suggest optimum methods for using the home electrical apparatuses to the user.

PTL 1 discloses a system for registering a home electrical apparatus in a server, on the condition that there is a match between identification information of the home electrical apparatus input from a mobile terminal and part of information provided from the home electrical apparatus to the server in a process of registering the home electrical apparatus in the server.

CITATION LIST

Patent Literature

PTL 1: WO 2015/118934

SUMMARY OF THE INVENTION

According to the method described in PTL 1, however, the user needs to input information from a mobile terminal. Thus, it is necessary to include a keyboard representation on the screen of the mobile terminal for inputting the information and cause the user to make the input using an input function. This results in a problem of inconvenience.

To solve the foregoing conventional problem, a remote control system according to the present disclosure includes: an electrical apparatus; a terminal device that performs an operation of registering the electrical apparatus; and a server device that accepts a request for the electrical apparatus from the terminal device. The terminal device includes: a first communication unit that communicates with the electrical apparatus and the server device; and a first controller that controls the terminal device. The first controller transmits a search request for searching the electrical apparatus to the electrical apparatus via the first communication unit, receives from the electrical apparatus via the first communication unit a search request response including a first encrypted apparatus ID in which an apparatus ID for identifying the electrical apparatus is encrypted from the electrical apparatus, transmits to the electrical apparatus via the first communication unit a notification request that includes the first encrypted apparatus ID and is intended to request for providing server transmission data to the server device, receives from the electrical apparatus via the first communication unit a completion response indicating that, in response to the notification request, transmission of the server transmission data including the apparatus ID and the first encrypted apparatus ID from the electrical apparatus to the server device has completed, and transmits to the server device via the first communication unit a registration status confirmation request that includes the first encrypted apparatus ID and is intended to request for confirmation of a registration status of the apparatus ID in the server device. The electrical apparatus includes: a second communication unit that communicates with the terminal device and the server device; and a second controller that controls the electrical apparatus. The second controller receives the search request from the terminal device via the second communication unit, transmits the search request response to the terminal device via the second communication unit, receives the notification request from the terminal device via the second communication unit, transmits the server transmission data to the server device via the second communication unit in response to the notification request, and transmits the completion response to the terminal device via the second communication unit. The server device includes: a third communication unit that communicates with the electrical apparatus and the terminal device; a storage unit that registers the apparatus ID of the electrical apparatus for which the request from the terminal device is acceptable; and a third controller that controls the server device. The third controller receives the server transmission data from the electrical apparatus via the third communication unit, receives the registration status confirmation request from the terminal device via the third communication unit, determines whether there is a match between the first encrypted apparatus ID received from the electrical apparatus and the first encrypted apparatus ID received from the terminal device, and when there is a match, registers the apparatus ID in a first security state in the storage unit.

According to the electrical apparatus registration method of the present disclosure, the user can register the electrical apparatus in the server without having to input identification information of the electrical apparatus to the mobile terminal.

BRIEF DESCRIPTION OF DRAWINGS

FIG. 7 is a diagram illustrating a specific example of associated information of product information and first encrypted apparatus IDs in the first exemplary embodiment.

FIG. 10 is a diagram illustrating a specific example of associated information of apparatus IDs, the first encrypted apparatus IDs, and second encrypted apparatus IDs.

FIG. 11A is a diagram illustrating a specific example of associated information of the apparatus IDs, the first encrypted apparatus IDs, the second encrypted apparatus IDs, and registration states.

FIG. 11B is a diagram illustrating a specific example of associated information of the apparatus IDs, the first encrypted apparatus IDs, the second encrypted apparatus IDs, and registration states.

FIG. 13 is a diagram illustrating a specific example of associated information of the apparatus IDs, the product information, the first encrypted apparatus IDs in the first exemplary embodiment.

DESCRIPTION OF EMBODIMENTS

Hereinafter, exemplary embodiments of the present disclosure will be described in detail with reference to the drawings. The exemplary embodiments described below are mere examples and the configuration of the system and the configurations of the functional blocks are not limited to the exemplary embodiments.

First Exemplary Embodiment

Figure 1:
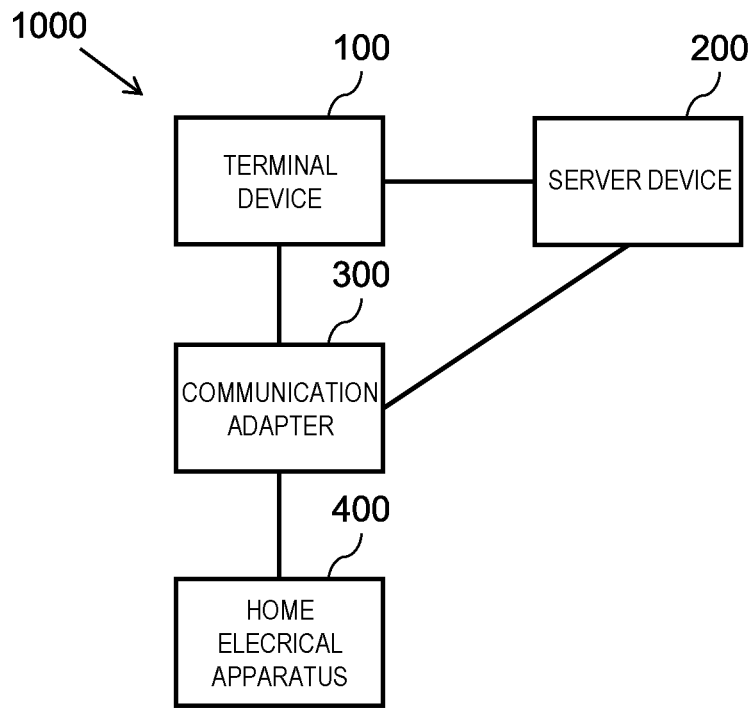
FIG. 1 is a schematic configuration diagram of a remote control system in a first exemplary embodiment.

FIG. 1 illustrates an entire configuration of remote control system 1000 in a first exemplary embodiment. Remote control system 1000 includes terminal device 100, server device 200, communication adapter 300, and home electrical apparatus 400.

Home electrical apparatus 400 is a home electrical apparatus that is installed in a house, which is air-conditioning equipment (for example, air conditioner), refrigerator-freezer, rice cooker, microwave oven, or washing and drying machine, for example. Home electrical apparatus 400 may be a single apparatus or a plurality of apparatuses. In the following description of the present exemplary embodiment, home electrical apparatus 400 is an air-conditioner.

The user can use terminal device 100 to power on and off home electrical apparatus 400 and perform operation control (for example, changing the temperature setting and adjusting the air volume in the air-conditioner) from a remote place. When the user executes an operation on terminal device 100, terminal device 100 transmits a control command to home electrical apparatus 400 via communication adapter 300. Home electrical apparatus 400 executes a process according to the received control command. The control command from terminal device 100 is sent to communication adapter 300 via server device 200 in consideration of security. Server device 200 manages a list of home electrical apparatuses 400 for accepting remote control from terminal device 100. Out of the control commands received from terminal device 100, server device 200 accepts only control commands to home electrical apparatuses 400 managed on the list.

Hereinafter, terminal device 100, server device 200, communication adapter 300, and home electrical apparatus 400 will be sequentially described in detail.

Figure 2:
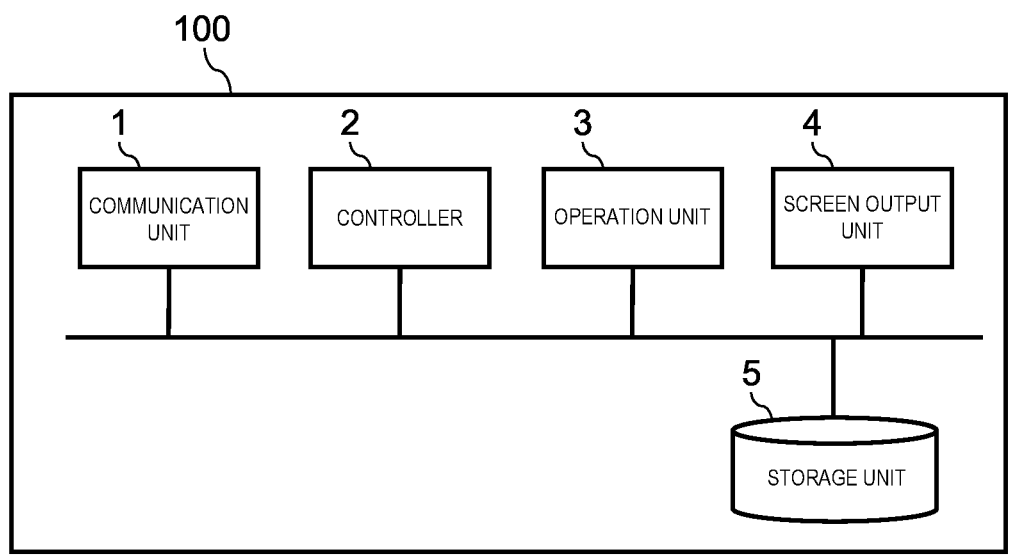
FIG. 2 is a functional block diagram of a terminal device in the first exemplary embodiment.
Figure 6:
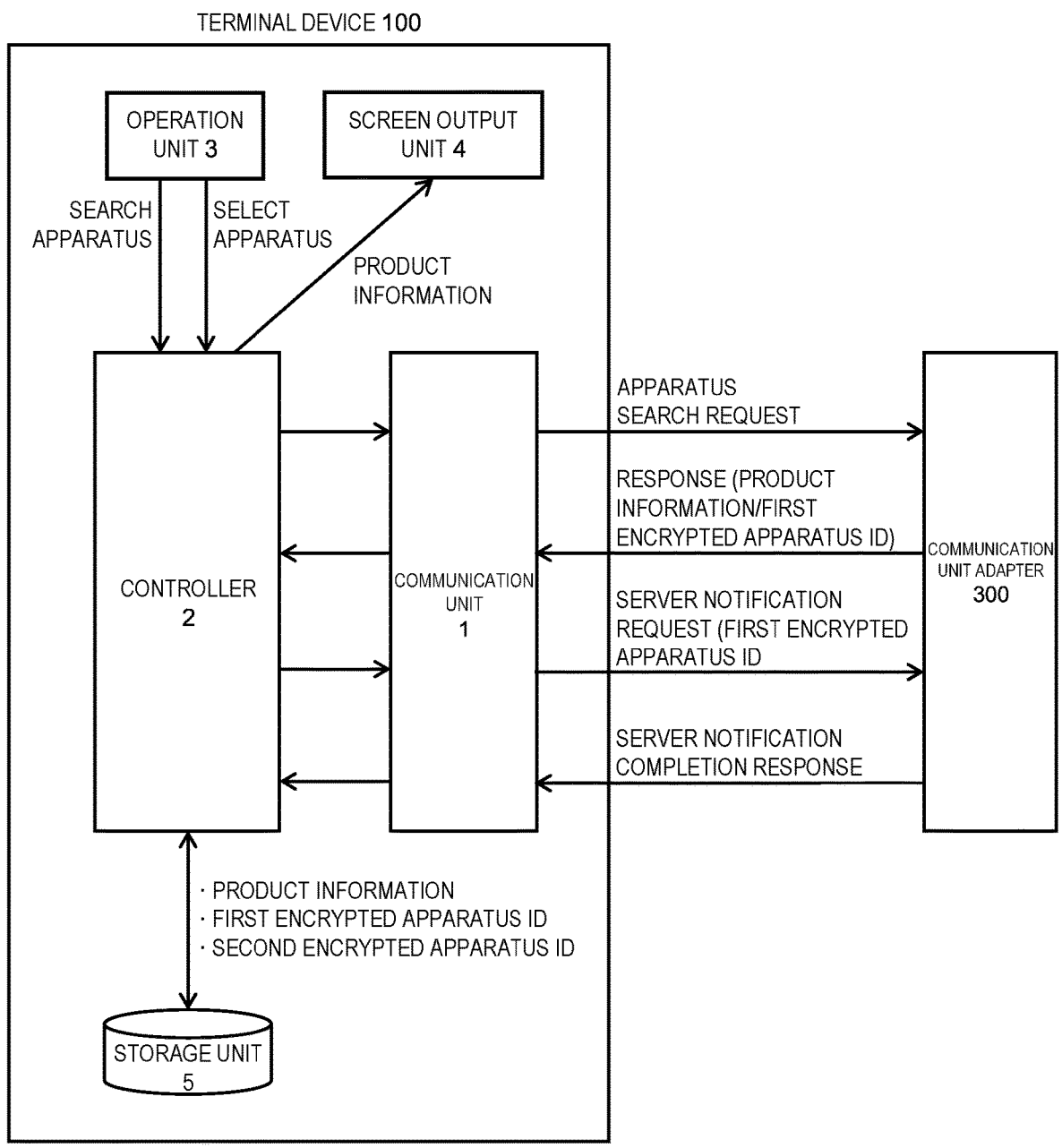
FIG. 6 is a diagram illustrating operations of the functional blocks of the terminal device in the first exemplary embodiment.

First, terminal device 100 will be described. FIG. 2 is a functional block diagram of main components of terminal device 100 in the first exemplary embodiment. FIG. 6 is a schematic diagram describing functions of terminal device 100.

Terminal device 100 illustrated in FIG. 1 is a communication device that is communicable with server device 200 and communication adapter 300, which is a cellular phone or a portable information terminal, for example.

In relation to the present embodiment, a mode in which terminal device 100 and server device 200 directly communicate with each other will be described. However, the present disclosure is not limited to this. Another server device may be interposed between terminal device 100 and server device 200. In relation to the present exemplary embodiment, a mode in which terminal device 100 and server device 200 communicate with home electrical apparatus 400 via communication adapter 300 will be described. However, the present disclosure is not limited to this. Functions of communication adapter 300 may be built in home electrical apparatus 400 so that communication adapter 300 and home electrical apparatus 400 are integrated.

Referring to FIG. 2, terminal device 100 includes communication unit 1, controller 2, operation unit 3, screen output unit 4, and storage unit 5.

Figure 3:
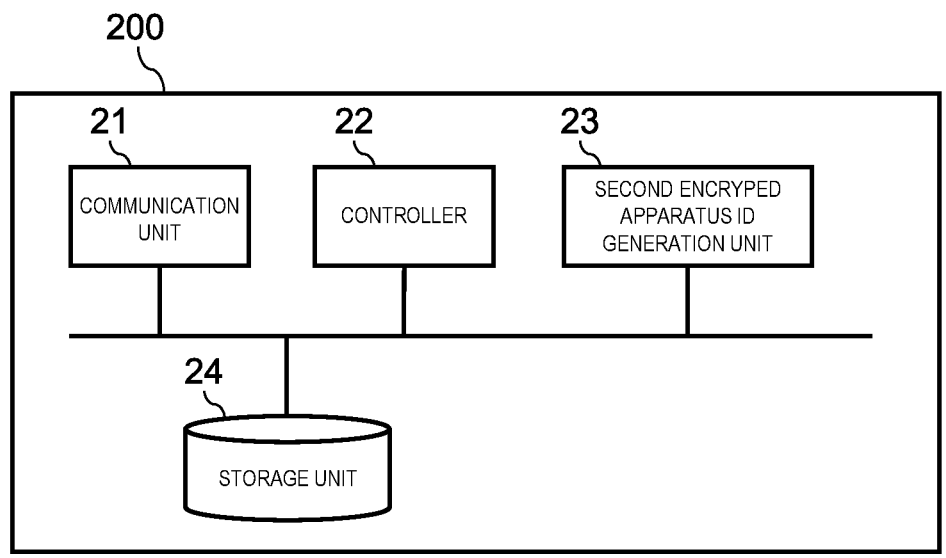
FIG. 3 is a functional block diagram of a server device in the first exemplary embodiment.

FIG. 3 is a functional block diagram of main components of server device 200 in the first exemplary embodiment. Referring to FIG. 3, server device 200 includes communication unit 21, controller 22, second encrypted apparatus ID generation unit 23 and storage unit 24.

Figure 4:
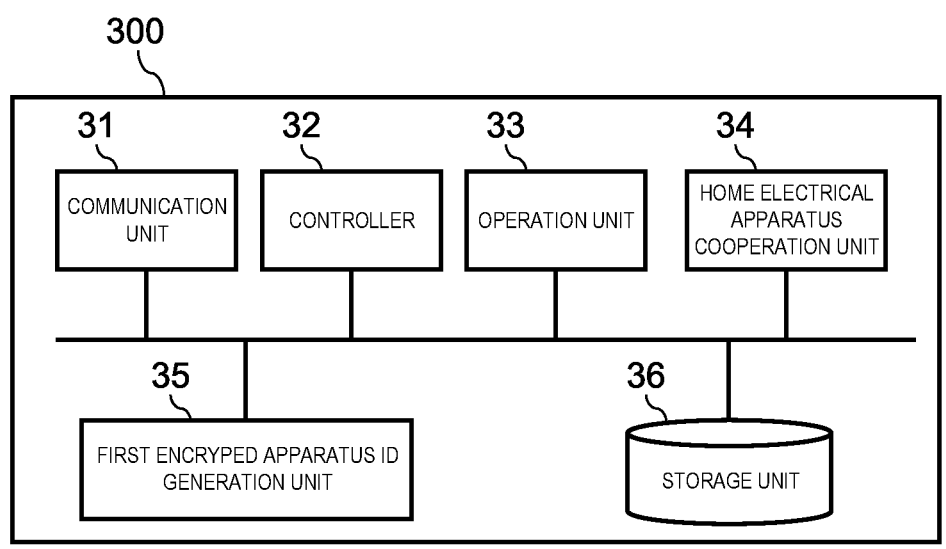
FIG. 4 is a functional block diagram of a communication adapter in the first exemplary embodiment.

FIG. 4 is a functional block diagram of main components of communication adapter 300 in the first exemplary embodiment. Referring to FIG. 4, communication adapter 300 includes communication unit 31, controller 32, operation unit 33, home electrical apparatus cooperation unit 34, first encrypted apparatus ID generation unit 35, and storage unit 36.

Figure 5:
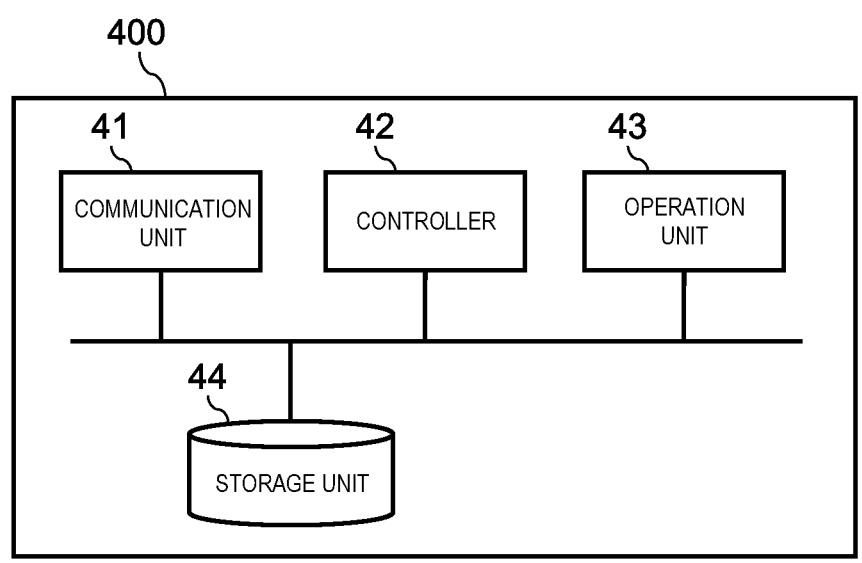
FIG. 5 is a functional block diagram of an electrical apparatus in the first exemplary embodiment.

FIG. 5 is a functional block diagram of main components of home electrical apparatus 400 in the first exemplary embodiment. Referring to FIG. 5, home electrical apparatus 400 includes communication unit 41, controller 42, operation unit 43, and storage unit 44.

Communication unit 1, communication unit 21, communication unit 31, and communication unit 41 perform wired communication via an Ethernet (registered trademark) LAN or wireless communication via a wireless LAN through a broadband router installed in the house. Communication unit 41 may communicate with communication adapter 300 in a unique wired communication mode.

Controller 2 controls entire terminal device 100. Controller 22 controls entire server device 200. Controller 32 controls entire communication adapter 300. Controller 42 controls entire home electrical apparatus 400.

Operation unit 3, operation unit 33, and operation unit 43 are formed from input devices such as touch panel, operation buttons, or keyboard to accept user operations. Screen output unit 4 outputs information to be displayed on a display or an external display.

Storage unit 5, storage unit 24, storage unit 36, and storage unit 44 are formed from hard disk drives or solid state drives (SSDs), which hold stored information.

Second encrypted apparatus ID generation unit 23 encrypts an input apparatus ID to generate a second encrypted ID. First encrypted apparatus ID generation unit 35 encrypts an input apparatus ID to generate a first encrypted ID. There is no particular limitation on the scheme for encryption. The encryption scheme may open-key encryption or symmetric-key encryption. First encrypted apparatus ID generation unit 35 and second encrypted apparatus ID generation unit 23 independently perform encryption on different devices. The generated first encrypted apparatus ID and second encrypted apparatus ID are generally different from each other.

Home electrical apparatus cooperation unit 34 acquires the apparatus ID from home electrical apparatus 400 via communication unit 41 and registers the apparatus ID in storage unit 36.

Communication unit 1, controller 2, and screen output unit 4 in terminal device 100, communication unit 21, controller 22, and second encrypted apparatus ID generation unit 23 in server device 200, communication unit 31, controller 32, home electrical apparatus cooperation unit 34, and first encrypted apparatus ID generation unit 35 in communication adapter 300, and communication unit 41 and controller 42 in home electrical apparatus 400 are formed from large scale integration (LSI) circuits as integrated circuits. These units may be individually formed in one chip or may be formed to include some or all of them in one chip. The integrated circuit is called here LSI but may also be called IC, system LSI, super LSI, or ultra LSI depending on differences in integration degree. The method for forming an integrated circuit is not limited to LSI but may be a dedicated circuit or a general-purpose processor. After production of an LSI, the individual components may be configured using a field programmable gate array (FPGA) capable of programming or a configurable processor that can re-configured connections and settings of circuit cells in the LSI. In addition, the individual components may be integrated by, instead of LSI, a technique for forming an integrated circuit derived from advancement of the semiconductor technology. For example, the components may be integrated by applying a biotechnology.

Operations of the functional blocks in terminal device 100 will be described with reference to FIG. 6.

Upon input of an apparatus search request from controller 2, communication unit 1 transmits the apparatus search request to communication adapter 300. Communication unit 1 also receives a response to the apparatus search request from communication adapter 300 and outputs the same to controller 2. The response to the apparatus search request from communication adapter 300 includes product information and a first encrypted apparatus ID. The product information is information for identifying a type or color of home electrical apparatus 400, which can be referred to in the product itself, a catalog, or the like. The first encrypted apparatus ID is information in which a serial number (apparatus ID) formed from at least one of numerals, alphabet letters, and symbols by which home electrical apparatus 400 can be uniquely identified is encrypted.

Upon input of an apparatus search instruction from operation unit 3, controller 2 generates an apparatus search request and outputs the same to communication unit 1. Out of the product information and the first encrypted apparatus ID acquired from communication adapter 300 via communication unit 1, controller 2 outputs the product information to screen output unit 4 and outputs the product information and the first encrypted apparatus ID to storage unit 5. FIG. 7 illustrates a specific example of associations between product information and first encrypted apparatus IDs stored in storage unit 5. Product information "NA-1000A" is stored in association with a first encrypted apparatus ID "abcdefghijklmn12345". Product information "NA-2000A" is stored in association with a first encrypted apparatus ID "abcdefghijklmn1234".

Upon input of an apparatus selection instruction including the product information from operation unit 3, controller 2 reads the first encrypted apparatus ID in association with the target product information from storage unit 5, and outputs a server notification request including the first encrypted apparatus ID to communication unit 1. For example, when the apparatus selection instruction including the product information "NA-1000A" is input from operation unit 3, the first encrypted apparatus ID "abcdefghijklmn12345" in association with the product information is read from storage unit 5, and the server notification request including the first encrypted apparatus ID is output to communication unit 1.

After outputting the server notification request to communication unit 1, upon input of a completion response to the server notification request from the communication adapter via communication unit 1, controller 2 outputs a registration status confirmation request including the first encrypted apparatus ID to communication unit 1.

After outputting the registration status confirmation request to communication unit 1, upon input of a completion response to the registration status confirmation request via communication unit 1, controller 2 extracts a second encrypted apparatus ID included in the completion response.

Controller 2 outputs a server registration request including the acquired second encrypted apparatus ID to communication unit 1, and upon input of a response to the server registration request via communication unit 1, controller 2 terminates the registration process.

Upon acceptance of an input relating to the device search instruction by a user operation, operation unit 3 outputs the input to controller 2. Specifically, operation unit 3 accepts the instruction input through a touch panel operation or a device operation using a keyboard or the like, and transfers the input instruction to controller 2.

Figure 8:
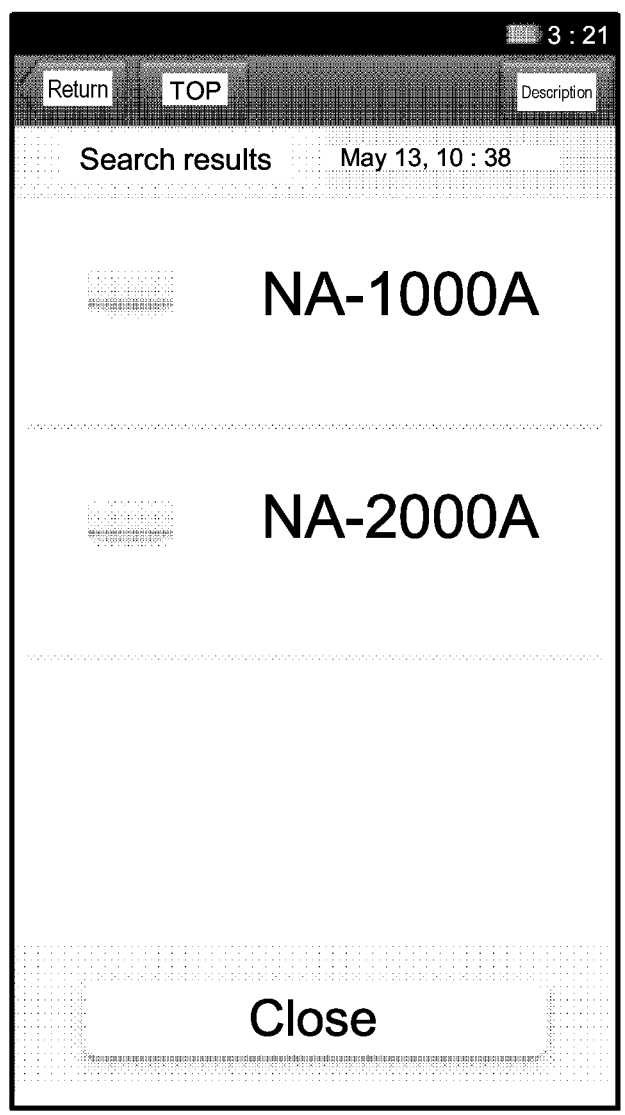
FIG. 8 is a diagram illustrating a specific example of an apparatus search result in the first exemplary embodiment.

Upon acceptance of the apparatus selection instruction by the user operation, operation unit 3 outputs the apparatus selection instruction including the selected product information to controller 2. Specifically, as illustrated in FIG. 8, when the product number "NA-1000A" of the home electrical apparatus listed on the screen of terminal device 100 is selected by a touch panel operation or a device operation using a keyboard or the like, controller 3 determines that the product information "NA-1000A" has been input and accepts the selection. Operation unit 3 outputs the apparatus selection instruction including the product information "NA-1000A" to controller 2.

Figure 9:
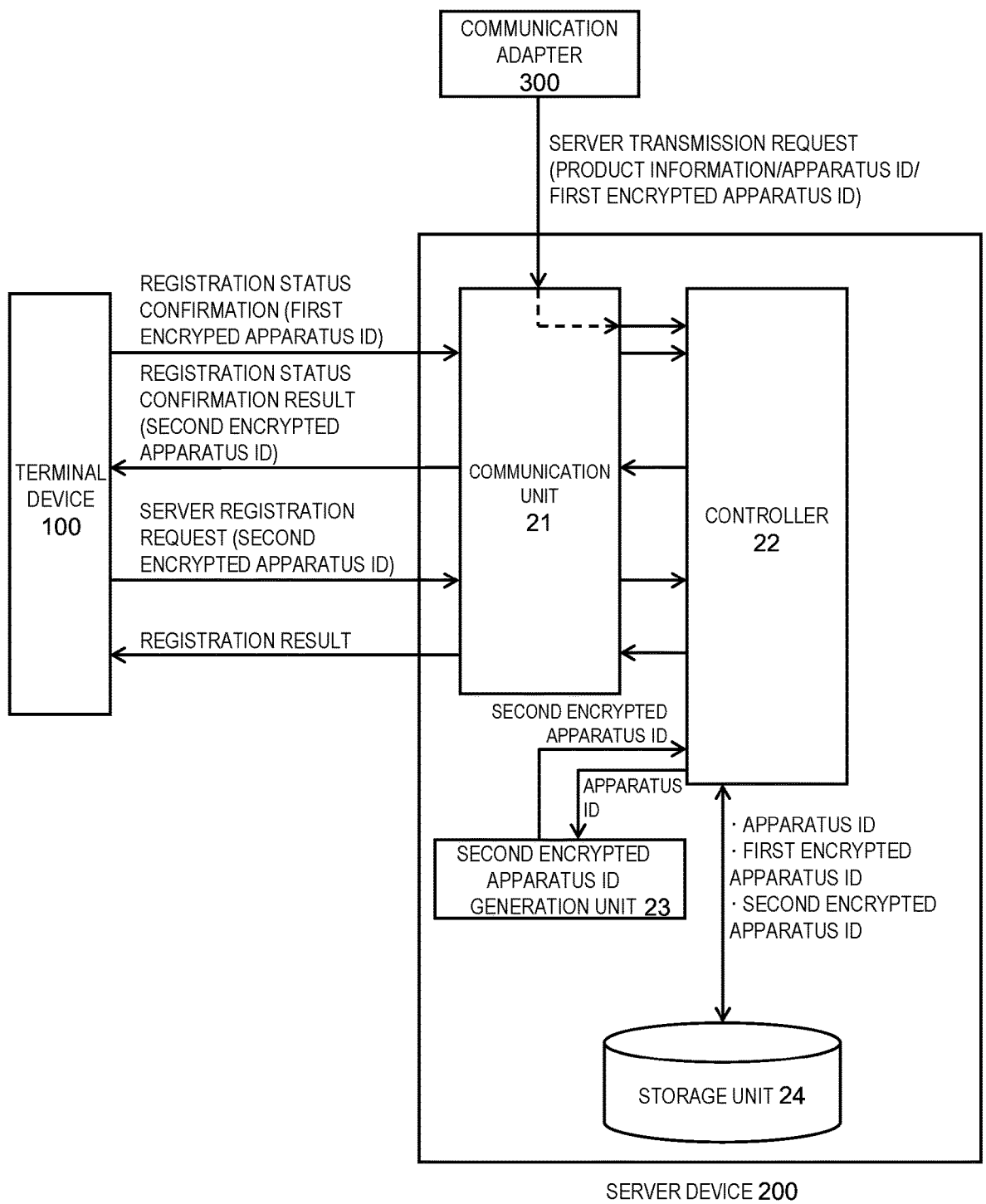
FIG. 9 is a diagram illustrating operations of the functional blocks of the server device in the first exemplary embodiment.

Next, operations of the functional blocks in server device 200 will be described with reference to FIG. 9.

Communication unit 21 outputs server transmission data received from communication adapter 300, to controller 22. The server transmission data includes the product information, the apparatus ID, and the first encrypted apparatus ID.

Upon input of a registration status confirmation request including the first encrypted apparatus ID via communication unit 1 of terminal device 100, communication unit 21 outputs a registration status confirmation request to controller 22.

Communication unit 21 transmits a response to the registration status confirmation request input via controller 22 together with the second encrypted apparatus ID to communication unit 1 of terminal device 100. The second encrypted apparatus ID refers to an ID in which the apparatus ID for uniquely identifying home electrical apparatus 400 is encrypted in server device 200. Storage unit 24 manages the apparatus IDs, the first encrypted apparatus IDs, and the second encrypted apparatus IDs in association with one another (see FIG. 10).

Upon receipt of a server registration request including the second encrypted apparatus ID, communication unit 21 outputs the server registration request to controller 22 and transmits a registration result acquired from controller 22 to communication unit 1 of terminal device 100.

Controller 22 registers in storage unit 24 the apparatus ID and the first encrypted apparatus ID included in the server transmission data received from communication adapter 300 via communication unit 21.

Upon input of the registration status confirmation request including the first encrypted apparatus ID via communication unit 21, controller 22 searches for the first encrypted apparatus ID registered in storage unit 24. When there exists the first encrypted apparatus ID, controller 22 extracts the apparatus ID associated with the first encrypted apparatus ID, and outputs a request for generation of the second encrypted apparatus ID to second encrypted apparatus ID generation unit 23 described later. Upon receipt of the second encrypted apparatus ID generated by second encrypted apparatus ID generation unit 23, controller 22 registers in storage unit 24 the apparatus ID, the first encrypted apparatus ID, and the second encrypted apparatus ID in association with one another. Specifically, when the registration status confirmation request including the first encrypted apparatus ID "abcdefghijklmn1234" illustrated in FIG. 10 is input into controller 22 via communication unit 21, controller 22 searches storage unit 24 and extracts an apparatus ID "NA-2000A+00001" of the corresponding apparatus. Controller 22 inputs a second encrypted apparatus ID generation request including the extracted apparatus ID "NA-2000A+00001" to the second encrypted apparatus ID generation unit 23. Upon acquisition of the generation result "1234abcdefghijklmn", controller 22 registers in storage unit 24 the second encrypted apparatus ID, the apparatus ID, and the first encrypted apparatus ID in association with one another. When determining that there is a match between the first encrypted apparatus IDs transmitted from terminal device 100 and communication adapter 300, controller 22 updates the registration status to "provisional" indicating provisional registration of the apparatus (see FIG. 11A). Specifically, the apparatus ID is registered in a first security state in storage unit 24. Controller 22 also transmits a registration status confirmation result including the generated second encrypted apparatus ID "1234abcdefghijklmn" to communication unit 1 of terminal device 100 via communication unit 21.

When a server registration request including the second encrypted apparatus ID is input via communication unit 21, controller 22 searches storage unit 24. When there exists the matching second encrypted apparatus ID, controller 22 updates the registration state from "provisional" to "completed" (see FIG. 11B). Specifically, the apparatus ID is registered in a second security state higher in security level than the first security state in storage unit 24. Further, controller 22 transmits the registration result to terminal device 100 via communication unit 21.

Upon input of a request of generation of the second encrypted apparatus ID including the apparatus ID from controller 22, the second encrypted apparatus ID generation unit 23 generates the second encrypted apparatus ID and returns a response including the generated second encrypted apparatus ID to controller 22.

Storage unit 24 manages the apparatus IDs for identifying home electrical apparatus 400, the first encrypted apparatuses ID, the second encrypted apparatuses ID, and the registration states in association with one another as illustrated in FIGS. 11A and 11B.

Figure 12:
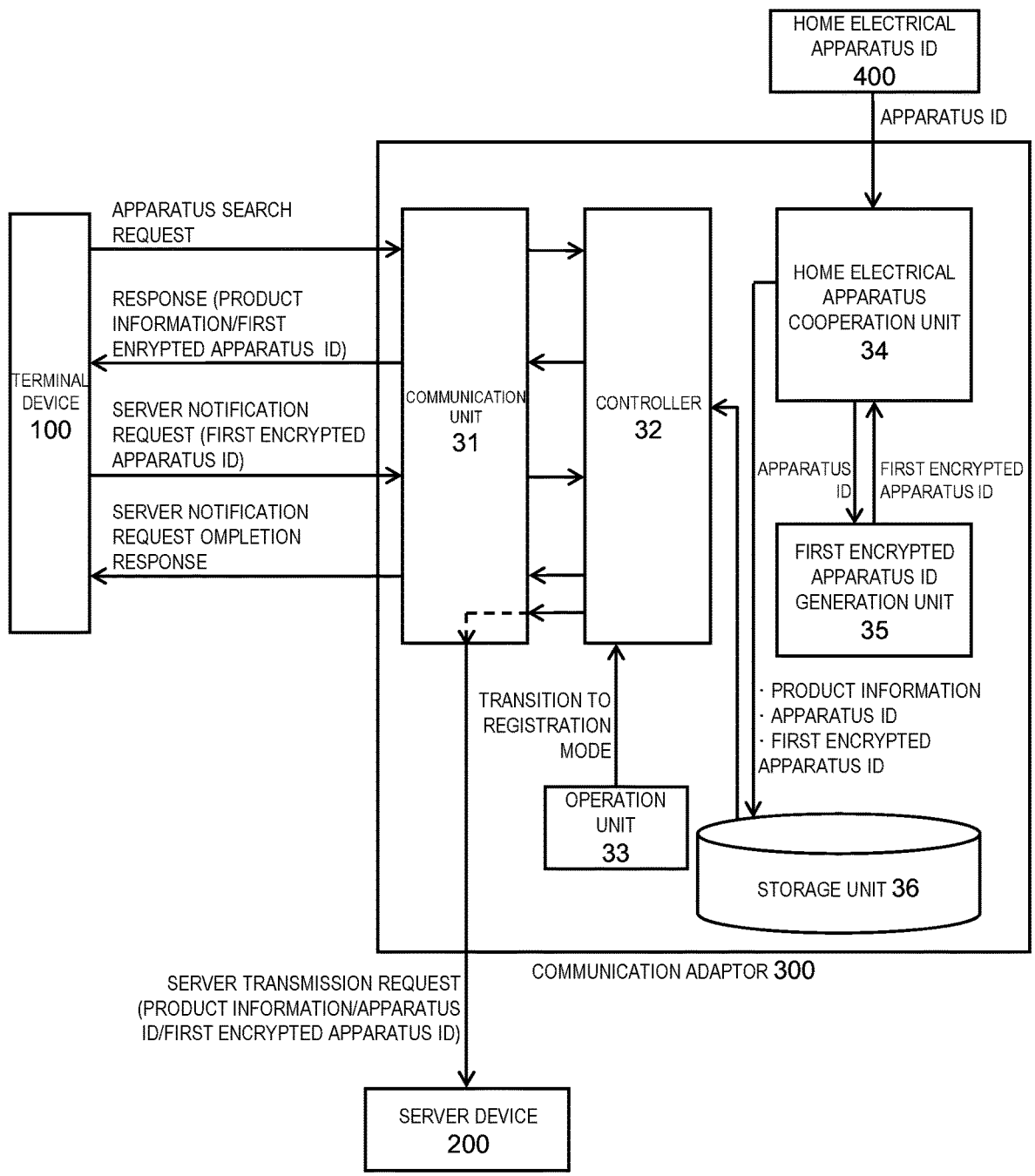
FIG. 12 is a diagram illustrating operations of the functional blocks of the communication adapter in the first exemplary embodiment.

Next, operations of the functional blocks in communication adapter 300 will be described with reference to FIG. 12.

Communication unit 31 outputs an apparatus search request received from terminal device 100 to controller 32. Upon input of a response to the apparatus search request (including the product information and the first encrypted apparatus ID) from controller 32, communication unit 31 transmits the product information and the first encrypted apparatus ID to communication unit 1 of terminal device 100.

Communication unit 31 outputs a server notification request (including the first encrypted apparatus ID) received from terminal device 100 to controller 32. Upon input of a response to the server notification request (notification request completion response) from controller 32, communication unit 31 transmits the notification request completion response to communication unit 1 of terminal device 100.

Upon input of a server transmission request including the apparatus ID, the product information, and the first encrypted apparatus ID from controller 32, communication unit 31 transmits the apparatus ID, the product information, and the first encrypted apparatus ID as server transmission data to communication unit 21 of server device 200.

Upon input of an apparatus search request from communication unit 31, controller 32 acquires the registered product information and first encrypted apparatus ID associated with each other in storage unit 36 and outputs the same to communication unit 31. FIG. 13 illustrates an example of association among the apparatus IDs, the product information, and the first encrypted apparatus IDs. Specifically, when home electrical apparatus 400 is powered on, product information generated by home electrical apparatus cooperation unit 34 after reception of the apparatus ID "NA-1000A+00001" transmitted from home electrical apparatus 400 (for example, the product number "NA-1000A" extracted from the apparatus ID), the first encrypted apparatus ID "abcdefghijklmn12345" generated by encrypting the apparatus ID, and the apparatus ID "NA-1000A+00001" are associated with one another.

Upon input of a server notification request including the first encrypted apparatus ID via communication unit 31, controller 32 reads the applicable first encrypted apparatus ID and the associated apparatus ID and product information from storage unit 36, and outputs a server transmission request to communication unit 31. Specifically, upon input of the server notification request including the first encrypted apparatus ID "abcdefghijklmn12345", controller 32 reads from storage unit 36 the apparatus ID "NA-1000A+00001" and the product information "NA-1000A" associated with the first encrypted apparatus ID "abcdefghijklmn12345", and outputs the first encrypted apparatus ID, the apparatus ID, and the product information to communication unit 31.

Upon input of a registration mode transition request from operation unit 33, controller 32 shifts to the state in which the acceptance of a server notification request input via communication unit 31 is permitted.

Upon input of the registration mode transition request by a user operation, operation unit 33 outputs the registration mode transition request to controller 32.

Upon input of the apparatus ID from communication unit 41 of home electrical apparatus 400, home electrical apparatus cooperation unit 34 outputs an encryption request including the apparatus ID to first encrypted apparatus ID generation unit 35 to encrypt the apparatus ID. The home electrical apparatus cooperation unit 34 outputs the generated first encrypted apparatus ID, the apparatus ID, and the product information extracted from the apparatus ID to storage unit 36.

Upon input of the encryption request including the apparatus ID from home electrical apparatus cooperation unit 34, first encrypted apparatus ID generation unit 35 generates the first encrypted apparatus ID and outputs a response including the first encrypted apparatus ID to home electrical apparatus cooperation unit 34.

The information including the apparatus IDs, the product information, and the first encrypted apparatus IDs is registered in storage unit 36 as illustrated in FIG. 13.

Figure 14:
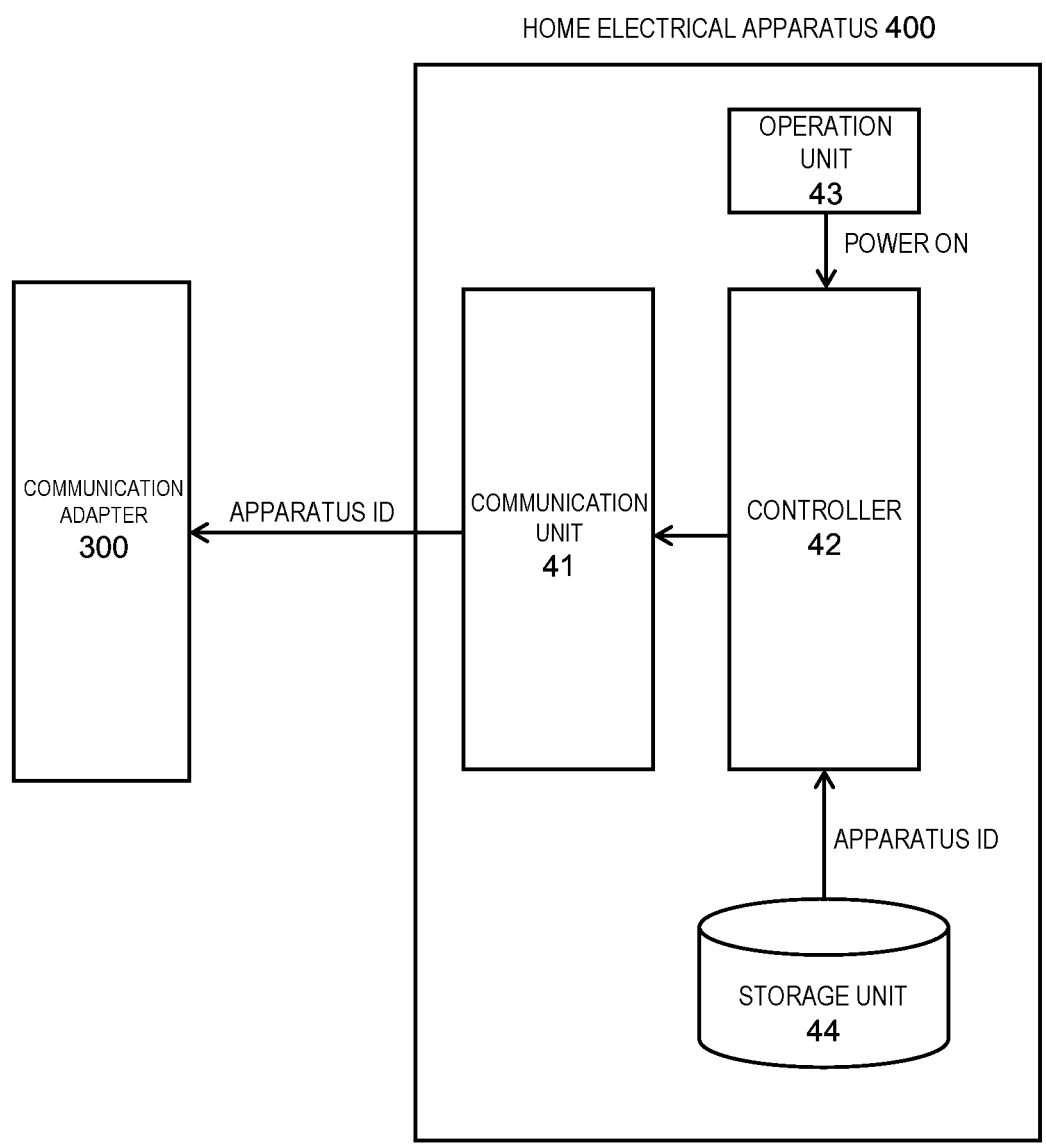
FIG. 14 is a diagram illustrating operations of the functional blocks of the home electrical apparatus in the first exemplary embodiment.

Next, operations of the functional blocks in home electrical apparatus 400 will be described with reference to FIG. 14.

Upon input of a notification request including the apparatus ID from controller 42, communication unit 41 transmits the apparatus ID to communication adapter 300.

Upon detection of power-on by operation unit 43, controller 42 reads the registered apparatus ID from storage unit 44, and outputs the same to communication unit 41.

Hereinafter, apparatus registration executed by terminal device 100, server device 200, communication adapter 300, and home electrical apparatus 400 in the present exemplary embodiment will be described.

Figure 15:
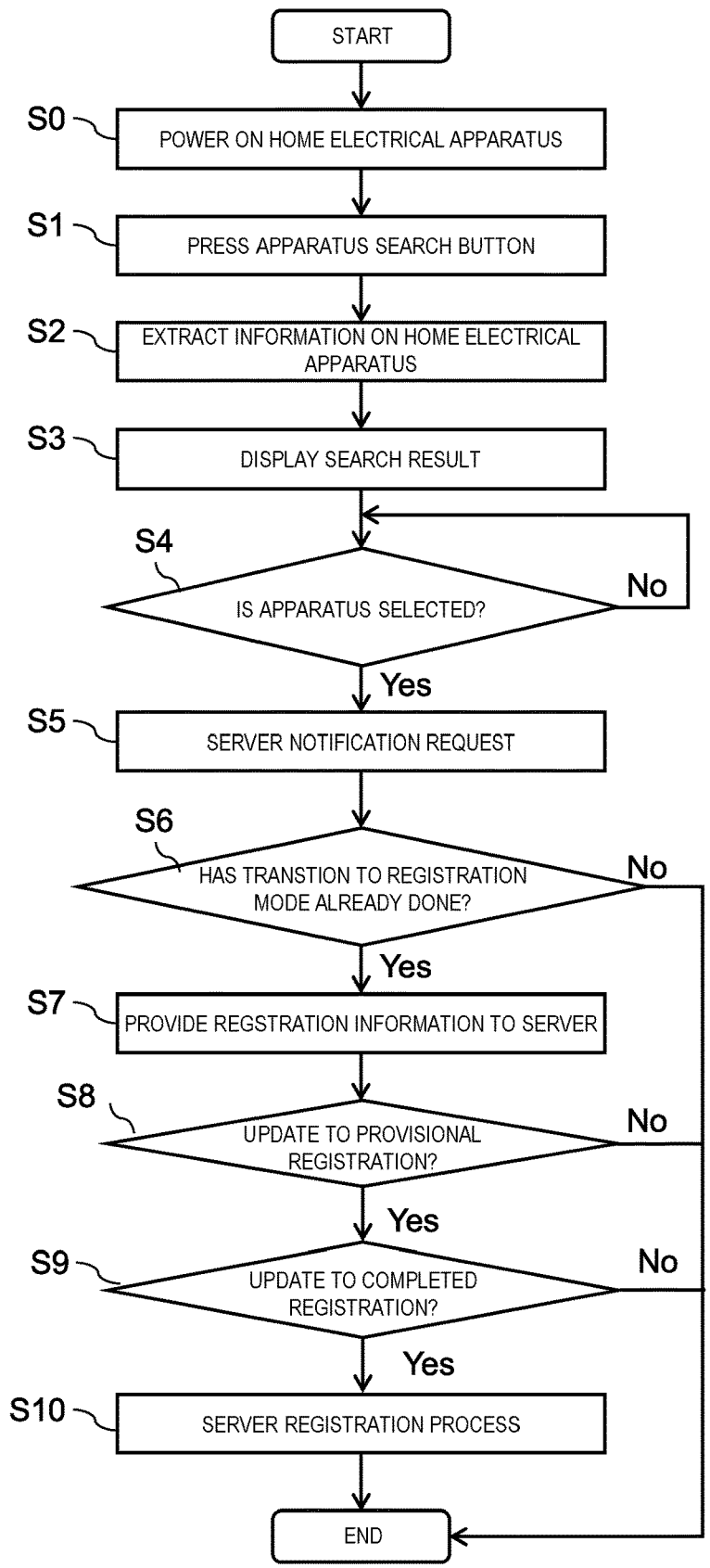
FIG. 15 is a flowchart of a process of registering the home electrical apparatus in the server device in the first exemplary embodiment.
Figure 16A:
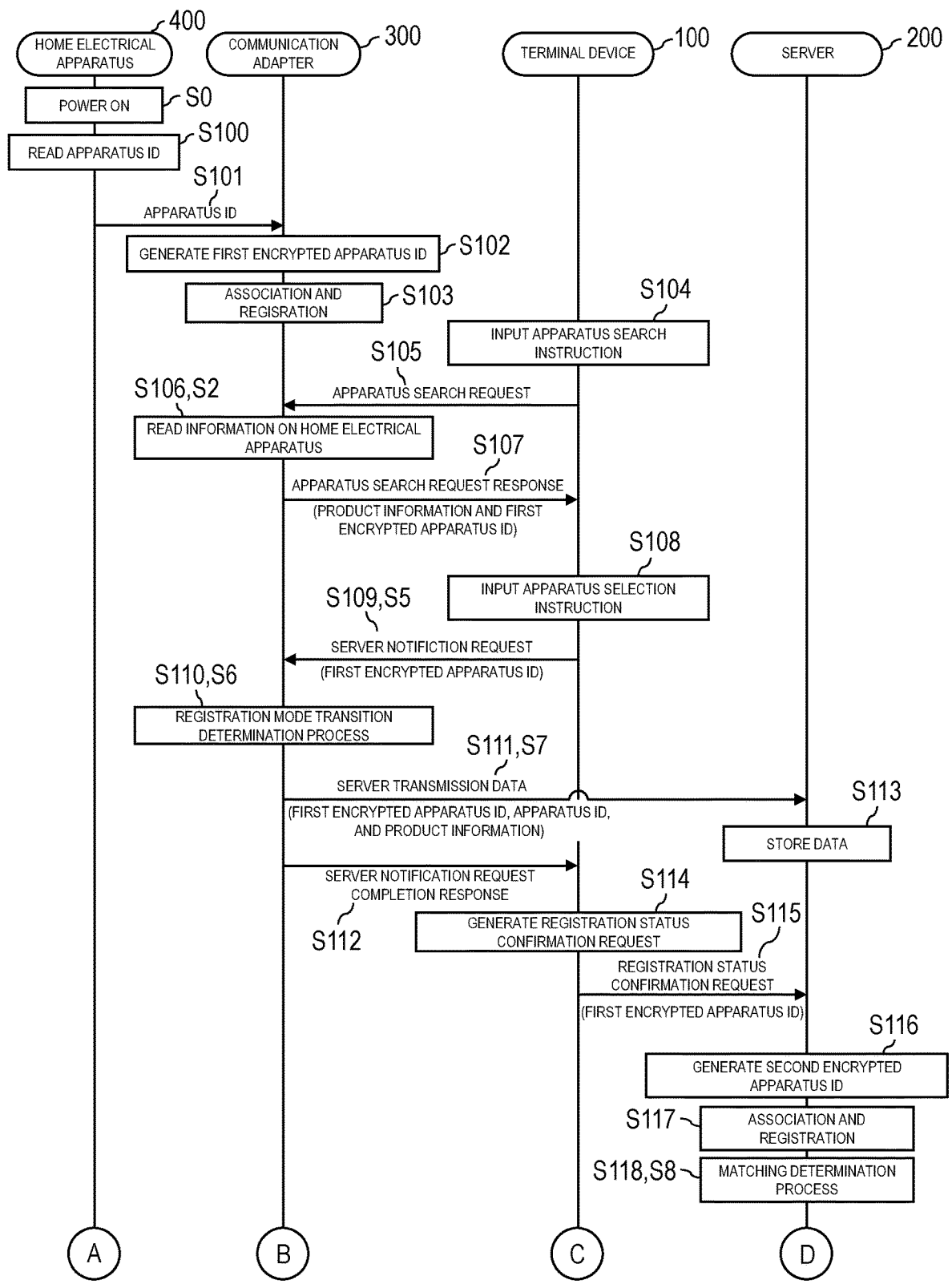
FIG. 16A is a sequence diagram illustrating operations of the remote control system in the first exemplary embodiment.
Figure 16B:
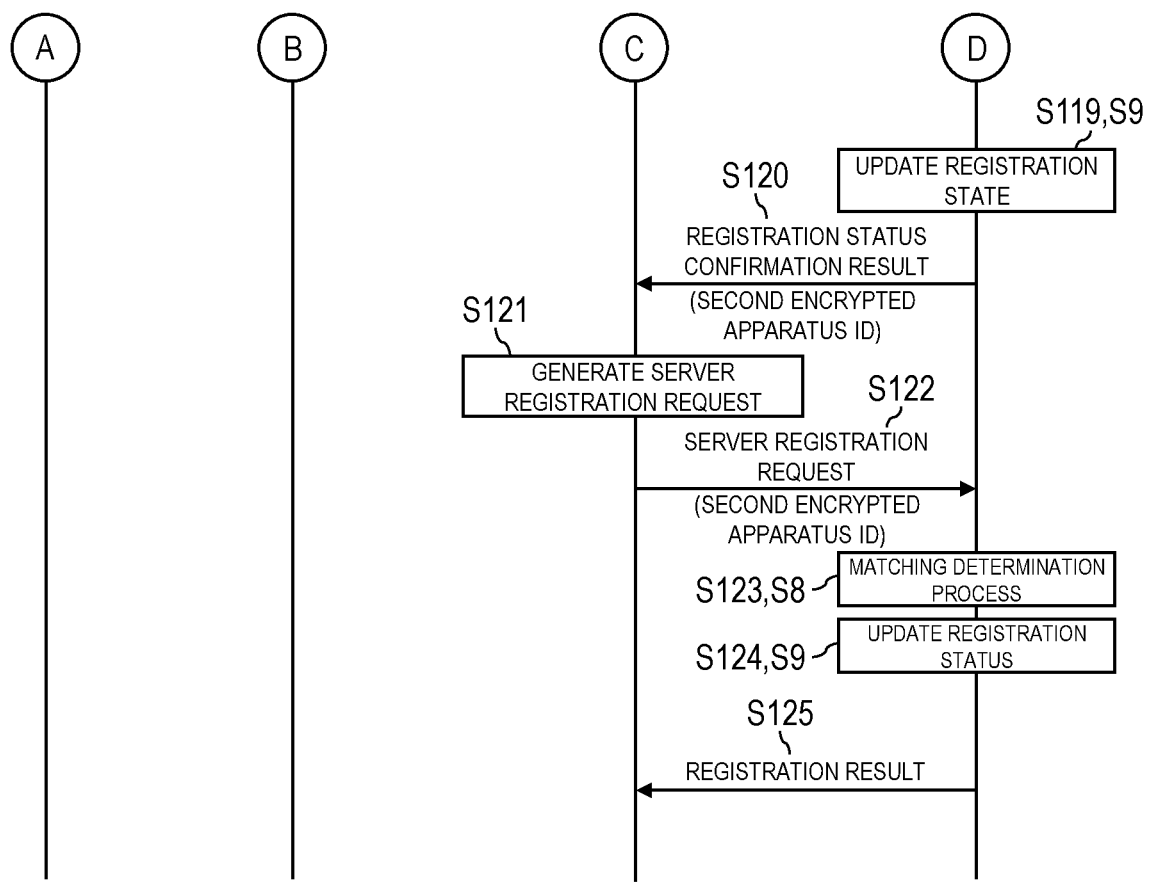
FIG. 16B is a sequence diagram illustrating the operations of the remote control system in the first exemplary embodiment (continued from FIG. 16A).

FIG. 15 is a flowchart of the apparatus registration performed by terminal device 100, server device 200, communication adapter 300, and home electrical apparatus 400 according to the first exemplary embodiment. FIGS. 16A and 16B are sequence diagrams describing the remote control system in the present exemplary embodiment. Operations of terminal device 100, server device 200, communication adapter 300, and home electrical apparatus 400 will be described with reference to FIGS. 15, 16A, and 16B.

The following description is based on the assumption that mutual authentication has been already performed in communications between terminal device 100 and server device 200. The mutual authentication can be performed by any method. Performing the mutual authentication before the communications between terminal device 100 and server device 200 further enhances security.

In home electrical apparatus 400, upon detection of power-on through a user operation by operation unit 43 (step S0), information relating to the power-on through a user operation is output to controller 42. Controller 42 reads the registered apparatus ID from storage unit 44 (step S100), and outputs a notification request including the apparatus ID to communication unit 41. Communication unit 41 transmits information including the apparatus ID to communication adapter 300 (step S101).

In communication adapter 300, upon input of the notification request including the apparatus ID to home electrical apparatus cooperation unit 34, an encryption request including the apparatus ID is output to first encrypted apparatus ID generation unit 35 to encrypt the apparatus ID. First encrypted apparatus ID generation unit 35 generates the first encrypted apparatus ID (step S102). The generated first encrypted apparatus ID, the apparatus ID, and the product information extracted from the apparatus ID are associated with one another and registered in storage unit 36 (step S103).

In terminal device 100, after issue of an apparatus search instruction by a user operation (step S1, S104), upon detection of an apparatus search request, operation unit 3 outputs the apparatus search request to controller 2. Controller 2 transmits the apparatus search request to communication unit 31 of communication adapter 300 via communication unit 1 (step S105).

In communication adapter 300, upon receipt of the apparatus search request, communication unit 31 outputs the apparatus search request to controller 32. Upon acceptance of the apparatus search request, controller 32 reads the registered product information and the associated first encrypted apparatus ID from storage unit 36 (step S2, S106) and outputs the same to communication unit 31. Communication unit 31 transmits an apparatus search request response including the product information and the first encrypted apparatus ID to terminal device 100 (step S107).

The product information and the first encrypted apparatus ID transmitted by communication unit 31 of communication adapter 300 are input to controller 2 via communication unit 1 of terminal device 100 and registered in storage unit 5. In addition, the product information is output to screen output unit 4 in terminal device 100 (step S3).

In terminal device 100, upon detection of an apparatus selection instruction by a user operation (step S108), operation unit 3 inputs information on the selected home electrical apparatus (product information) to controller 2 (Yes in step S4).

In terminal device 100, controller 2 reads the first encrypted apparatus ID associated with the product information from storage unit 5, and transmits a server notification request including the first encrypted apparatus ID to communication unit 31 of communication adapter 300 (step S5, S109).

In communication adapter 300, the server notification request received via communication unit 31 is input to controller 32. Controller 32 checks whether terminal device 100 is in the state already shifted to a registration mode (step S110). When there is a preliminary input from operation unit 33 in communication adapter 300 and controller 32 determines that terminal device 100 is in the state already shifted to the registration mode (Yes in step S6), controller 32 extracts the applicable first encrypted apparatus ID and the associated apparatus ID and product information from storage unit 36 and outputs a server transmission request to communication unit 31. The server transmission data including the first encrypted apparatus ID, the apparatus ID, and the product information is provided to server device 200 via communication unit 31 (step S7, S111). After that, a notification request completion response is transmitted to terminal device 100 via communication unit 31 (step S112). Then, the first encrypted apparatus ID and the apparatus ID included in the server transmission data are stored in storage unit 36 (step S113).

When not determining that terminal device 100 is in the registration mode (No in step S6), controller 32 terminates the process without performing server registration processing. Accordingly, a process of registering home electrical apparatus 400 in server device 200 is performed only when an operation of shifting to the registration mode is performed by operation unit 33 of communication adapter 300. This enhances security in the registration process.

In terminal device 100, upon input of a notification request completion response to controller 2 via communication unit 1 (step S112), controller 2 generates a registration status confirmation request including the first encrypted apparatus ID (step S114). Then, the registration status confirmation request including the first encrypted apparatus ID is output to server device 200 (step S115). In server device 200, upon input of the registration status confirmation request to controller 22 via communication unit 21, controller 22 searches for the first encrypted apparatus ID registered in storage unit 24. When the first encrypted apparatus ID exists in storage unit 24, controller 22 extracts the apparatus ID associated with the first encrypted apparatus ID, and outputs a generation request of the second encrypted apparatus ID to second encrypted apparatus ID generation unit 23. Then, second encrypted apparatus ID generation unit 23 generates the second encrypted apparatus ID (step S116). Upon receipt of the second encrypted apparatus ID generated by second encrypted apparatus ID generation unit 23, controller 22 registers the apparatus ID, the first encrypted apparatus ID, and the second encrypted apparatus ID as associated information in storage unit 24 (step S117). Controller 22 determines whether there is a match between the first encrypted apparatus ID transmitted from terminal device 100 and the first encrypted apparatus ID transmitted from communication adapter 300 (step S118). When determining that there is a match between the first encrypted apparatus IDs transmitted from terminal device 100 and communication adapter 300, controller 22 updates the registration state to "provisional" indicating provisional registration of the apparatus (Yes in step S8, S119). Specifically, the apparatus ID is registered in the first security state in storage unit 24. Then, controller 22 transmits a registration status confirmation result including the generated second encrypted apparatus ID to communication unit 1 of terminal device 100 via communication unit 21 (step S120).

In terminal device 100, upon input of the registration status confirmation result (including the second encrypted apparatus ID) received via communication unit 1, controller 2 generates a server registration request including the second encrypted apparatus ID (step S121), and outputs the server registration request to communication unit 1 (step S122). In server device 200, upon input of the server registration request via communication unit 21, controller 22 determines whether there exists in storage unit 24 the second encrypted apparatus ID matching the second encrypted apparatus ID transmitted from terminal device 100 (step S123). When there exists the matching second encrypted apparatus ID, controller 22 updates the registration state from "provisional" to "completed" (see FIG. 11B) (Yes in step S9, S124). Specifically, the apparatus ID is registered in a second security state higher in security level than the first security state in storage unit 24. Further, controller 22 transmits the registration result to terminal device 100 via communication unit 21 (step S125).

As described above, the apparatus ID for identifying a home electrical apparatus is automatically encrypted in terminal device 100, server device 200, communication adapter 300, and home electrical apparatus 400, and the encrypted information is used to check the validity of the home electrical apparatus as a registration target and register the home electrical apparatus in the server device, which allows the user to make an apparatus registration without inputting the identification information of the home electrical apparatus from the terminal device.

In the exemplary embodiment described above, in step S8, when there is a match between the first encrypted apparatus IDs received from terminal device 100 and communication adapter 300, server device 200 makes a provisional registration of home electrical apparatus 400, and then, in step S9, after the exchange of the second encrypted apparatus ID between terminal device 100 and server device 200, server device 200 updates the registration state to "completed". However, the present disclosure is not limited to this but, when there is a match between the first encrypted apparatus IDs received from terminal device 100 and communication adapter 300, server device 200 may update the registration state to "registration completed", not "provisional registration". In this case as well, the user can make an apparatus registration without inputting identification information of the home electrical apparatus from the terminal device. After the provisional registration, exchanging the second encrypted apparatus ID between terminal device 100 and server device 200 and updating the registration state to "completed" makes it possible to further enhance security. That is, the security state is updated from the first security state to the second security state higher in security level than the first security state.

In the exemplary embodiment described above, upon input of a server registration request, controller 22 in server device 200 updates the server registration state to "completed". However, if no server registration request is input within a certain time (for example, two hours) since the reception of the server transmission data, controller 22 may perform a process for a registration failure. This realizes a registration scheme under higher-degree security management.

In the exemplary embodiment described above, when the transition mode for determining whether to accept a registration of home electrical apparatus 400 is the registration mode for accepting a registration, controller 32 in communication adapter 300 accepts a server notification request from terminal device 100. The present disclosure is not limited to this but a server notification request may be accepted without shifting to the registration mode.

Before transmission of the first encrypted ID to server device 200, terminal device 100 may perform mutual authentication with server device 200 via first communication unit 1.

In addition, the present disclosure also includes a program for causing a computer to execute individual processes in the remote control system described above in relation to the exemplary embodiment and a storage medium storing the program.

Controller 2, 22, 32 may be configured in any manner as far as it performs the controls described above. Controller 2, 22, 32 may be formed from an arithmetic processing unit and a storage unit storing a control program. The arithmetic processing unit can be a micro processing unit (MPU) and a central processing unit (CPU) as an example. The storage unit can be a memory as an example. The control program recorded in the storage unit is executed by the arithmetic processing unit.

Controller 2, 22, 32 may be formed from a hard logic. Forming controller 2, 22, 32 from a hard logic is effective in improving the processing speed. The constituent elements may be formed from one semiconductor chip or may be physically formed from a plurality of semiconductor chips. In the case of forming the constituent elements from a plurality of semiconductor chips, the controls described above can be implemented by different semiconductor chips.

INDUSTRIAL APPLICABILITY

The electrical apparatus registration method according to the present disclosure makes it possible to register a home electrical apparatus connected to a network without performing an input operation of identification information of the home electrical apparatus from a terminal device, which is useful in a server system using a smartphone or a tablet. The server system may be implemented and operated in a relay device in a house. The present disclosure is usable for not only home electrical apparatuses in the exemplary embodiment but also electric devices used at stores, facilities, offices, factories, vehicles, and others.

REFERENCE MARKS IN THE DRAWINGS

100: terminal device
200: server device
300: communication adapter
400: home electrical apparatus
1000: remote control system
1: communication unit (first communication unit)
2: controller (first controller)
3: operation unit
4: screen output unit
5: storage unit
21: communication unit (third communication unit)
22: controller (third controller)
23: second encrypted apparatus ID generation unit
24: storage unit
31: communication unit (second communication unit)
32: controller (second controller)
33: operation unit
34: home electrical apparatus cooperation unit
35: first encrypted apparatus ID generation unit
36: storage unit
41: communication unit (second communication unit)
42: controller (second controller)
43: operation unit
44: storage unit

The invention claimed is:

1. A remote control system comprising:
an electrical apparatus;
a terminal device that performs an operation of registering the electrical apparatus; and
a server device that accepts a request for the electrical apparatus from the terminal device;
wherein the terminal device includes:
 a first communication engine that communicates with the electrical apparatus and the server device; and
 a first controller that controls the terminal device, transmits to the electrical apparatus, via the first communication engine, a search request for searching the electrical apparatus, receives from the electrical apparatus, via the first communication engine, a search request response including a first encrypted apparatus ID in which an apparatus ID for identifying the electrical apparatus is encrypted, transmits to the electrical apparatus, via the first communication engine, a notification request that includes the first encrypted apparatus ID and is intended to request for providing server transmission data to the server device, receives from the electrical apparatus, via the first communication engine, a completion response indicating that, in response to the notification request, transmission of the server transmission data including the apparatus ID and the first encrypted apparatus ID from the electrical apparatus to the server device has completed, and transmits to the server device, via the first communication engine, a registration status confirmation request that includes the first encrypted apparatus ID and is intended to request for confirmation of a registration status of the apparatus ID in the server device;
wherein the electrical apparatus includes:
 a second communication engine that communicates with the terminal device and the server device; and
 a second controller that controls the electrical apparatus, receives the search request from the terminal device via the second communication engine, transmits the search request response to the terminal device via the second communication engine, receives the notification request from the terminal device via the second communication engine, transmits the server transmission data to the server device via the second communication engine in response to the notification request, and transmits the completion response to the terminal device via the second communication engine;
wherein the server device includes:
 a third communication engine that communicates with the electrical apparatus and the terminal device;
 a storage unit that registers the apparatus ID of the electrical apparatus for which the request from the terminal device is acceptable; and
 a third controller that controls the server device, receives the server transmission data from the electrical apparatus via the third communication engine, receives the registration status confirmation request from the terminal device via the third communication engine, determines whether there is a match between the first encrypted apparatus ID received from the electrical apparatus and the first encrypted apparatus ID received from the terminal device, and when there is a match, registers the apparatus ID in a first security state in the storage unit.

2. The remote control system according to claim 1, wherein the first controller receives from the server device, via the first communication engine, a registration status conformation result including a second encrypted apparatus ID in which the apparatus ID is encrypted in the server device, transmits a registration request that includes the second encrypted apparatus ID and is intended to request for registration of the apparatus ID, and receives from the server device, via the first communication engine, a registration result of the apparatus ID in the server device in response to the registration request, and the third controller stores the second encrypted apparatus ID in the storage unit, transmits the registration status confirmation result to the terminal device via the third communication engine, receives the registration request from the terminal device via the third communication engine, and when there is a match between the second encrypted apparatus ID included in the registration request and the second encrypted apparatus ID stored in the storage unit, registers the apparatus ID in a second security state higher in security level than the first security state in the storage unit, and transmits the registration result to the terminal device via the third communication engine.

3. The remote control system according to claim 1, wherein the second controller has a transition mode in which to determine whether registration of the electrical apparatus is to be accepted, and when the transition mode is a registration mode in which to accept registration of the electrical apparatus, accepts the notification request.

4. The remote control system according to claim 1, wherein the terminal device and the server device perform mutual authentication before the first encrypted apparatus ID is transmitted from the terminal device to the server device.

5. A server device that accepts a request for an electrical apparatus from a terminal device performing an operation of registering the electrical apparatus, the server device comprising:
   a third communication engine that communicates with the electrical apparatus and the terminal device;
   a storage unit that registers an apparatus ID for identifying the electrical apparatus for which a request from the terminal device is acceptable; and
   a third controller that controls the server device;
   wherein the third controller receives, via the third communication engine, server transmission data that includes the apparatus ID and a first encrypted apparatus ID in which the apparatus ID is encrypted and that is transmitted from the electrical apparatus in response to a notification request to the server device received from the terminal device, receives from the terminal device, via the third communication engine, a registration status confirmation request that includes the first encrypted apparatus ID and is intended to request for confirmation of a registration status of the apparatus ID in the server device, determines whether there is a match between the first encrypted apparatus ID received from the electrical apparatus and the first encrypted apparatus ID received from the terminal device, and when there is a match, registers the apparatus ID in a first security state in the storage unit.

6. The server device according to claim 5, wherein the third controller transmits to the terminal device, via the third communication engine, a registration status confirmation result including a second encrypted apparatus ID in which the apparatus ID is encrypted in the server device, stores the second encrypted apparatus ID in the storage unit, receives from the terminal device, via the third communication engine, a registration request that includes the second encrypted apparatus ID and is intended to request registration of the apparatus ID, and when there is a match between the second encrypted apparatus ID included in the registration request and the second encrypted apparatus ID registered in the storage unit, registers the apparatus ID in a second security state higher in security level than the first security state in the storage unit, and transmits to the terminal device, via the third communication engine, a registration result of the apparatus ID in the server device in response to the registration request.

7. The server device according to claim 5, wherein the third controller performs mutual authentication with the terminal device via the third communication engine before receipt of the first encrypted apparatus ID from the terminal device.

8. A terminal device that makes a request for an electrical apparatus via a server device, the terminal device comprising:
   a physical memory;
   a first communication engine that communicates with the electrical apparatus and the server device; and
   a first controller that controls the terminal device;
   wherein the first controller transmits a search request for searching the electrical apparatus to the electrical apparatus, via the first communication engine, receives, via the first communication engine, a search request response including a first encrypted apparatus ID in which an apparatus ID for identifying the electrical apparatus is encrypted from the electrical apparatus, transmits to the electrical apparatus, via the first communication engine, a notification request that includes the first encrypted apparatus ID and is intended to request for providing server transmission data to the server device, receives from the electrical apparatus a completion response indicating that, in response to the notification request, transmission of the server transmission data including the apparatus ID and the first encrypted apparatus ID from the electrical apparatus to the server device has completed, and transmits to the server device, via the first communication engine, a registration status confirmation request that includes the first encrypted apparatus ID received from the electrical apparatus for determining in the server device whether there is a match with the first encrypted apparatus ID transmitted from the electrical apparatus in response to the notification request and that is intended to request for confirmation of a registration status of the apparatus ID in the server device.

9. The terminal device according to claim 8, wherein the first controller receives from the server device, via the first communication engine, a registration status confirmation result including a second encrypted apparatus ID in which the apparatus ID is encrypted in the server device, transmits to the server device, via the first communication engine, a registration request that includes the second encrypted apparatus ID and is intended to request for registration of the apparatus ID, and receives from the server device, via the first communication engine, a registration result of the apparatus ID in the server device in response to the registration request.

10. The terminal device according to claim 8, wherein the first controller performs mutual authentication with the server device via the first communication engine before transmission of the first encrypted apparatus ID to the server device.

11. An electrical apparatus registration method in a remote control system including an electrical apparatus, a terminal device that performs an operation of registering the electrical apparatus, and a server device that accepts a request for the electrical apparatus from the terminal device, the electrical apparatus registration method comprising:
   transmitting, by the terminal device, an apparatus search request for searching the electrical apparatus to the electrical apparatus,
   transmitting, by the electrical apparatus, to the terminal device a search request response that includes a first encrypted apparatus ID in which an apparatus ID for identifying the electrical apparatus is encrypted,
   transmitting, by the terminal device, to the electrical apparatus a notification request that includes the first encrypted apparatus ID and is intended to request for providing server transmission data to the server device, transmitting, by the electrical apparatus, to the server device the server transmission data including the apparatus ID and the first encrypted apparatus ID in response to the notification request, transmitting, by the electrical apparatus, to the terminal device a notification request completion response indicating transmission of the server transmission data to the server device has completed, transmitting, by the terminal device, to the server device a registration status confirmation request that includes the first encrypted apparatus ID and is intended to request for confirmation of a registration status of the apparatus ID in the server device, and determining, by the server device, whether there is a match between the first encrypted apparatus ID received from the electrical apparatus and the first encrypted apparatus ID received from the terminal device, and when there is a match, registers the apparatus ID in a first security state in the server device.

12. The electrical apparatus registration method according to claim 11, further comprising:

transmitting, by the server device, to the terminal device a registration status confirmation result that includes a second encrypted apparatus ID in which the apparatus ID is encrypted, storing, by the server device the second encrypted apparatus ID in the server device, transmitting, by the terminal device, to the server device a registration request that includes the second encrypted apparatus ID and is intended to request for registration of the apparatus ID, receiving, by the server device, the registration request from the terminal device, when there is a match between the second encrypted apparatus ID included in the registration request and the second encrypted apparatus ID stored in the server device, the server device registers the apparatus ID in a second security state higher in security level than the first security state in the server device, and transmitting, by the server device, a registration result of the apparatus ID to the terminal device.

13. The electrical apparatus registration method according to claim 12, wherein, when a registration request including the second encrypted apparatus ID has not been received from the terminal device within a predetermined time after receipt of the server transmission data, the server device transmits to the terminal device a failure response indicating that the apparatus ID is not registered.

14. The electrical apparatus registration method according to claim 11, wherein the terminal device and the server device perform mutual authentication before transmission of the first encrypted apparatus ID and the second encrypted apparatus ID from the terminal device to the server device.

15. The electrical apparatus registration method according to claim 11, wherein the electrical apparatus has a transition mode in which to determine whether registration of the electrical apparatus is to be accepted, and when the transition mode is a registration mode in which to accept registration, the electrical apparatus accepts the notification request from the terminal device.

16. A non-transitory computer-readable memory storing a program for causing a computer that is mounted in a server device accepting a request for an electrical apparatus from a terminal device performing an operation of registering the electrical apparatus, to execute a process of:

receiving server transmission data that includes an apparatus ID and a first encrypted apparatus ID in which the apparatus ID is encrypted and is transmitted from the electrical apparatus in response to a notification request from the terminal device;

receiving from the terminal device a registration status confirmation request that includes the first encrypted apparatus ID and is intended to request for confirmation of a registration status of the electrical apparatus in the server device;

determining whether there is a match between the first encrypted apparatus ID received from the electrical apparatus and the first encrypted apparatus ID received from the terminal device; and when there is a match, registering the apparatus ID in a first security state in the server device.

17. An electrical apparatus registration method in a remote control system including an electrical apparatus, a terminal device that performs an operation of registering the electrical apparatus, and a server device that accepts a request for the electrical apparatus from the terminal device, the electrical apparatus registration method comprising:

transmitting, by the electrical apparatus to the server device, an apparatus ID for identifying the electrical apparatus and a first encrypted apparatus ID in which the apparatus ID is encrypted in response to a request from the terminal device, transmitting, by the terminal device, the first encrypted apparatus ID to the server device, and determining, by a sever device, whether there is a match between the first encrypted apparatus ID received from the electrical apparatus and the first encrypted apparatus ID received from the terminal device, and, when there is a match, registers the apparatus ID in a first security state in the server device.

* * * * *